(12) United States Patent
Phillips et al.

(10) Patent No.: US 8,242,427 B2
(45) Date of Patent: Aug. 14, 2012

(54) SYSTEM AND METHOD FOR OPTICALLY CO-REGISTERING PIXELS

(75) Inventors: Dane J. Phillips, Athens, AL (US); Michael W. Jones, Madison, AL (US)

(73) Assignee: Digital Fusion, Inc., Huntsville, AL (US)

( * ) Notice: Subject to any disclaimer, the term of this patent is extended or adjusted under 35 U.S.C. 154(b) by 97 days.

(21) Appl. No.: 12/190,447

(22) Filed: Aug. 12, 2008

(65) Prior Publication Data

US 2010/0038525 A1 Feb. 18, 2010

(51) Int. Cl.
G02B 27/10 (2006.01)
G02B 13/16 (2006.01)

(52) U.S. Cl. .............. 250/208.1; 359/619; 359/621; 359/622

(58) Field of Classification Search ............ 250/208.1; 359/618, 619, 621, 622
See application file for complete search history.

(56) References Cited

U.S. PATENT DOCUMENTS

| | | | |
|---|---|---|---|
| 3,133,200 A * | 5/1964 | Collyer | 250/216 |
| 5,438,414 A | 8/1995 | Rust | |
| 5,479,015 A | 12/1995 | Rudman et al. | |
| 6,124,974 A | 9/2000 | Burger | |
| 6,233,003 B1 | 5/2001 | Ono | |
| 6,236,508 B1 | 5/2001 | Stapelbroek | |
| 6,268,915 B1 | 7/2001 | Abraham et al. | |
| 6,275,291 B1 | 8/2001 | Abraham et al. | |
| 6,639,683 B1 | 10/2003 | Tumbar et al. | |
| 7,236,304 B2 * | 6/2007 | Okayama et al. | 359/626 |
| 7,242,478 B1 | 7/2007 | Dombrowski et al. | |
| 7,301,138 B2 | 11/2007 | Yafuso | |
| 2002/0154215 A1 * | 10/2002 | Schechterman et al. | 348/51 |
| 2003/0147652 A1 | 8/2003 | Green et al. | |
| 2005/0254127 A1 | 11/2005 | Evans et al. | |
| 2007/0241267 A1 * | 10/2007 | Gruev et al. | 250/225 |

OTHER PUBLICATIONS

Wei, Hua; Tyo, J. Scott; Turner, Theodore S.; Design of a Hybrid Division of Aperture/Division of Focal Plane Polarimeter; College of Optical Sciences; University of Arizona; Tucson, Arizona.

Tyo, J. Scott; Hybrid division of aperture/division of a focal-plane polarimeter for real-time polarization imagery without an instantaneous field-of-view error; College of Optical Sciences; University of Arizona; Sep. 25, 2006; Tucson, Arizona.

* cited by examiner

*Primary Examiner* — Tony Ko
(74) *Attorney, Agent, or Firm* — Ann I. Dennen; Lanier Ford Shaver & Payne, PC (57) ABSTRACT

A system of the present disclosure has an optical element having a plurality of contiguous lenses, a detecting device having a plurality of light-sensitive pixels, the optical element having a lens in the plurality of lenses associated with each of the plurality of light-sensitive pixels, and intermediate imaging optics for receiving light indicative of an image and focusing the light onto the plurality of contiguous lenses such that the image is divided on each of the associated light-sensitive pixels.

6 Claims, 12 Drawing Sheets

SYSTEM AND METHOD FOR OPTICALLY CO-REGISTERING PIXELS

This invention was made with Government support under Contract No. FA9453-07-M-0121 awarded by the U.S. Air Force. The Government has certain rights in the invention.

BACKGROUND OF THE INVENTION

Objects emit and/or reflect light. Systems and devices are oftentimes employed, for example in sensing systems, to detect the light emitted and/or reflected from objects. Such systems are used to discern the nature of the object.

Light emitted and/or reflected from objects can exhibit differing wavelengths. For example, objects emit and/or reflect light in the visible waveband (0.4-0.7 microns), which is that waveband discernible by the human eye. In addition, however, objects emit and/or reflect light in other wavebands, for example in the infrared (IR) waveband (1-20 microns). There are various systems for detecting light in differing wavebands.

For example, a focal plane array (FPA) is a device comprised of a plurality of light-sensing pixels. The light-sensing pixels are typically comprised of a material that is sensitive in a particular waveband based upon how the system is to be used, e.g., whether it is desired for detection of visible light or infrared light.

Oftentimes, there is a front-end optical train that focuses the light emitted and/or reflected from an object onto the FPA. In addition, there is typically a computing device communicatively coupled to the FPA for receiving electrical signals from the FPA. Upon receipt, the computing device can store data indicative of the electrical signals and/or analyze the data as needed for a particular application.

Light emitted and/or reflected from objects can also be filtered. The filtering of the light can lead to additional information about a scene or an object in a scene. For example, polarization content in light waves can be used to analyze a scene or an object.

In this regard, light waves are electromagnetic waves made up of both electric and magnetic fields. As light waves propagate, the electric and magnetic fields vibrate in a geometric plane that is oriented orthogonally to the direction of travel of the light. Polarization is a property of electromagnetic waves that describes the orientation of the electromagnetic waves in such an orthogonal plane.

An imaging polarimeter refers to a device that measures the orientation of the various electric field components contained in light emitted from and/or reflected from an object or a scene. Notably, the degree to which light that is emitted and/or reflected by an object or a scene is "polarized" is a complex function of the material makeup, surface roughness, and look angle between the observer and the surface normal of an object facet because of the geometry, roughness and material properties of the objects embedded in the scene.

Measurement of the polarization content of a scene improves the ability to detect and discriminate objects over that provided by conventional intensity imaging. This is in part because man-made objects tend to exhibit a higher degree of polarization than natural background. Polarimetric imaging exploits this property to provide increased detectability and discrimination over conventional intensity imaging.

SUMMARY OF THE INVENTION

A system in accordance with an embodiment of the present disclosure comprises an optical element having a plurality of contiguous and connected lenses and a detecting device having a plurality of light-sensitive pixels, the optical element having a lens in the plurality of lenses associated with the plurality of light-sensitive pixels. The system further comprises an intermediate imaging optic for receiving light indicative of an image and focusing the light onto the plurality of contiguous and connected lenses such that the image is produced on each of the associated light-sensitive pixels.

A method in accordance with an embodiment of the present disclosure comprises the steps of receiving light indicative of an image and optically co-registering a plurality of pixels with the image.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the figures.

DETAILED DESCRIPTION OF THE INVENTION

Figure 1:
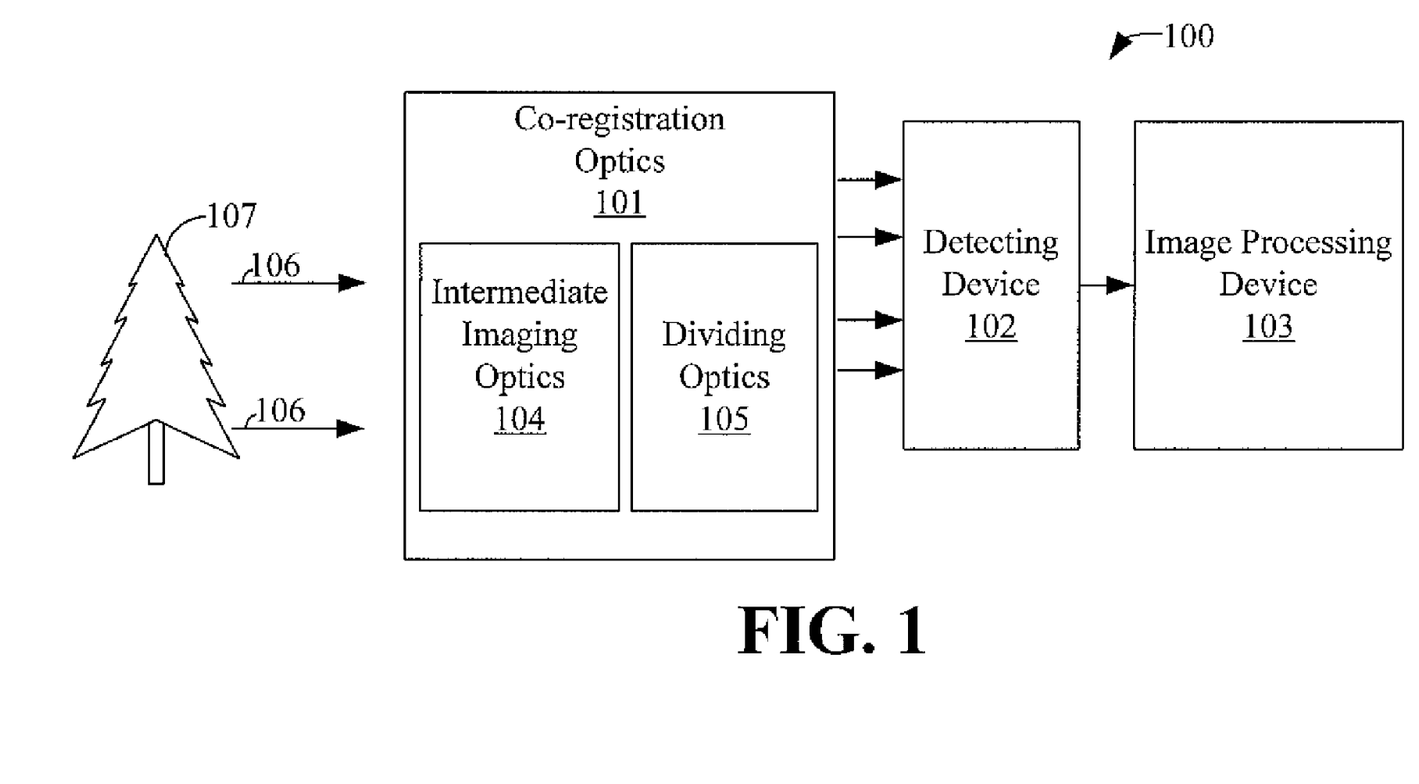
FIG. 1 is a block diagram depicting an exemplary system for optically co-registering pixels in accordance with an embodiment of the present disclosure.

FIG. 1 is a block diagram depicting an exemplary system 100 for optically co-registering pixels in accordance with an embodiment of the present disclosure. The system 100 comprises co-registration optics 101, a detecting device 102, and an image processing device 103.

An object 107 emits and/or reflects light, indicated by reference numerals 106. The co-registration optics 101 receive and propagate the light 106 to the detecting device 102. The detecting device 102 transmits electric signals indicative of the light 106 to the image processing device 103, which resolves the image 107, if possible.

The co-registration optics 101 comprise intermediate imaging optics 104 and dividing optics 105. The intermediate imaging optics 104 are made of a material and exhibit a shape such that the intermediate imaging optics 104 propagate and focus the light to a point at a center (not shown) of the dividing optics 105. As an example, the intermediate imaging optics 104 may comprise a lens.

The dividing optics 105 divides the light from the intermediate imaging optics 104. In this regard, energy indicative of the light is divided on a plurality of light-sensing pixels (not shown) in a subset of a plurality of light-sensing pixels of the detecting device 102, which is described further with reference to FIGS. 2 and 3. Energy is propagated and divided on a per-pixel basis. Note that the energy may, in one embodiment, be equally divided on the light-sensing pixels.

The detecting device 102 is communicatively coupled to the image processing device 103. When the light 106 strikes the detecting device 102, the detecting device 102 generates a plurality of electric signals (not shown) representative of the light detected. The image processing device 103 resolves the image, if possible, based upon the signals received from the detecting device 102.

FIG. 1 is a block diagram for illustrating exemplary components of the system 100. While FIG. 1 shows the co-registration optics 101, the dividing optics 105, and the detecting device 102 as separate components, in one embodiment each of these components 101, 105, and 102 is formed, through microfabrication, on a single silicon chip.

Figure 2:
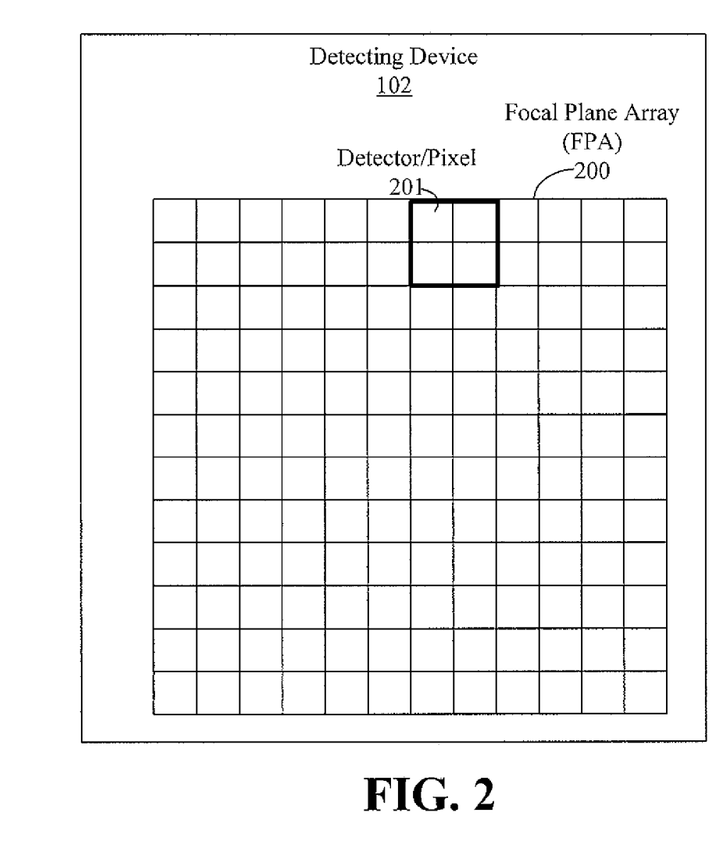
FIG. 2 is a block diagram of an exemplary focal point array (FPA) of the detecting device depicted in FIG. 1.

A block diagram depicting an exemplary detecting device 102 is shown in FIG. 2. The detecting device 102 comprises a focal plane array (FPA) 200. The FPA 200 is a matrix of contiguous detectors and/or light-sensing pixels 201.

Note that for simplicity of discussion, the FPA 200 is a matrix of 12×12 light-sensing pixels 201. However, exemplary sizes of an FPA 200 include, but are not limited to, 256×256, 512×512, or 640×480. The numbers in the exemplary sizes indicate the number of pixels that are contained in the FPA 200. For example, a 256×256 FPA 200 would have 256 rows of 256 light-sensing pixels 201 thereby having a total of 65,536 light-sensing pixels 201. Other numbers of light-sensing pixels 201 are possible in other embodiments of the FPA 200.

In addition, the bandwidth of light detectable by the FPA 200 relates, at least in part, to the type of material used to fabricate the FPA 200. As an example, for detection of mid-wave infrared in the 1-5 micron (μm) waveband, indium antimonide (InSb) semiconductor material is used in fabricating the FPA 200. As another example, for detection of long-wave infrared in the 8-12 micron (μm) wave band, Mercury Cadmium Telluride (HgCdTe) semiconductor material is used in fabricating the FPA 200. Note that the type of material used depends upon the waveband one desires to detect with the FPA 200.

Figure 3:
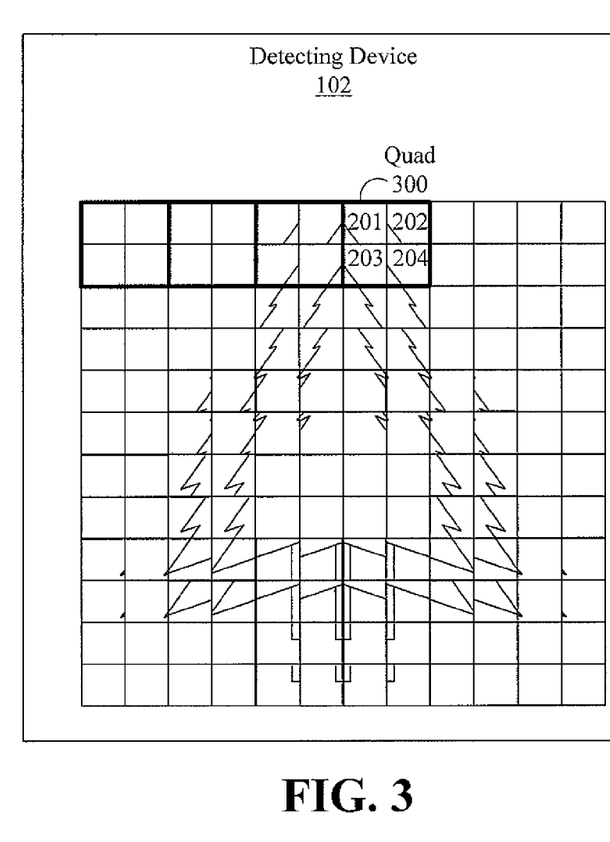
FIG. 3 is a block diagram of the FPA of FIG. 2 having co-registered pixels as imaged by the system of FIG. 1 for optically co-registering pixels.

As indicated with reference to FIG. 1, the co-registration optics 101 (FIG. 1) propagate light 106 (FIG. 1) emitted and/or reflected by the object 107 (FIG. 1) to the detecting device 102. FIG. 3 depicts an FPA 200 energized by the co-registration optics 101. For illustration and discussion, in one embodiment of the system 100, the FPA 200 can be visualized as an array of pixel quadrants 300, and each pixel quadrant 300 is made up of four pixels 201-204. Thus, for the 12×12 light-sensing pixels 201 in the FPA 200 there are 36 pixel quadrants 300 having four light-sensing pixels 201-204 in each pixel quadrant 300.

Note that spatially, FIG. 3 shows each of the energized pixels 201-204 in each quadrant 300 as having literally an imaged portion of the object 107. However, this is shown for theoretical and illustrative purposes only. What is imaged onto the FPA 200 per pixel 201-204 is not an image but a gray scale projection of the energy propagated per pixel 201-204 from the dividing optics 105.

As described hereinabove with reference to FIG. 1, the intermediate imaging optics 104 (FIG. 1) focuses light indicative of an image onto the dividing optics 105, which include a plurality of contiguous lenses shown in more detail with reference to FIGS. 4 and 5. The dividing optics 105 divides energy indicative of a portion of the light emitted and/or reflected from the object 107 onto each pixel 201-204 per pixel quadrant 300. Thus, substantially the same image or the same amount of energy strikes each of the four pixels 201-204 in each of the quadrants 300.

Figures 4, 5:
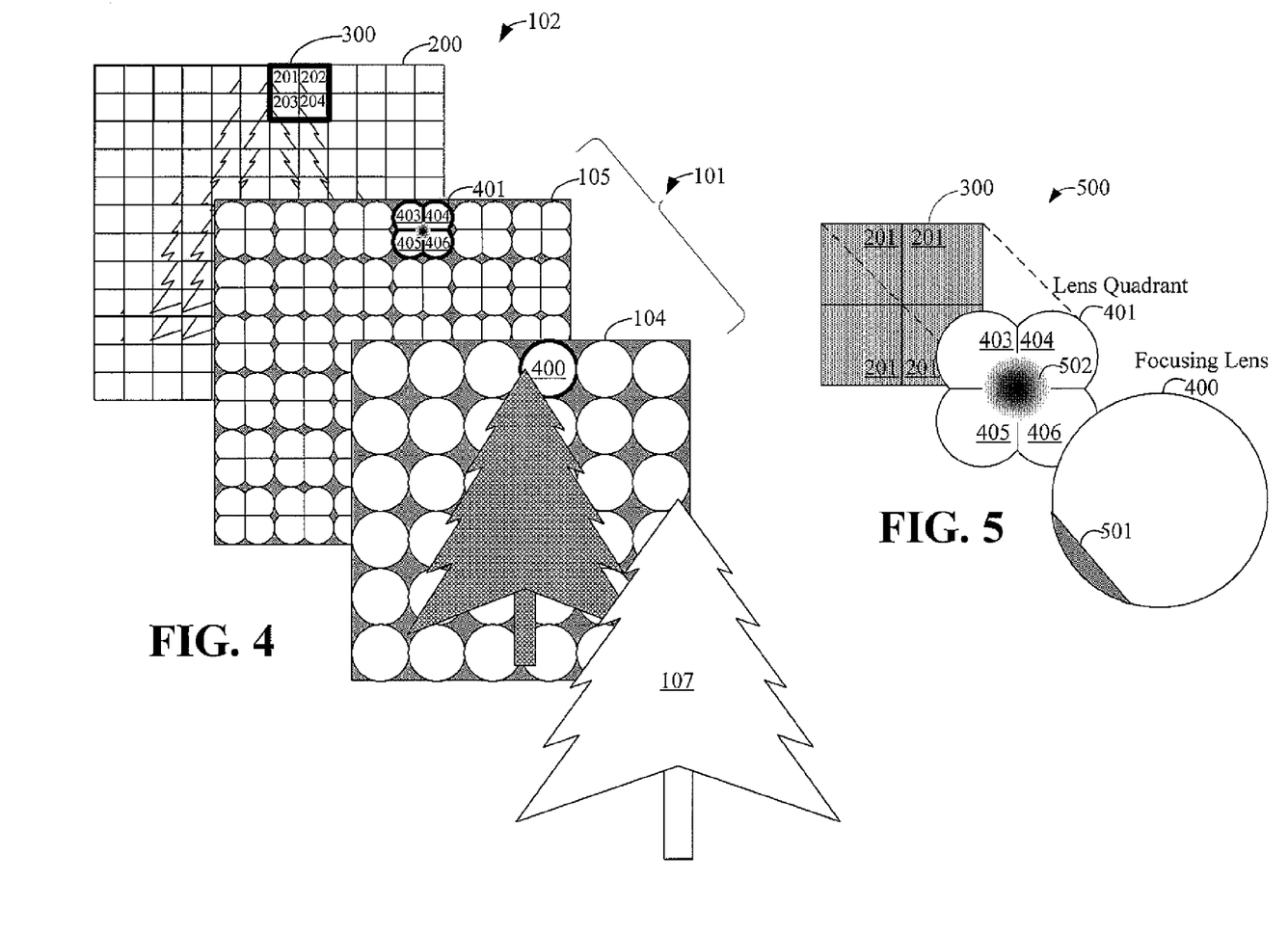
FIG. 4 is a block diagram depicting optical components of the system depicted in FIG. 1.
FIG. 5 is a block diagram of an optics train of the system of FIG. 1.

FIG. 4 depicts an exploded view of the system 100 for optically co-registering pixels as depicted in FIG. 1. The co-registration optics 101 comprise the intermediate imaging optics 104 and the dividing optics 105, as described with reference to FIG. 1.

In one embodiment, the intermediate imaging optics 104 comprise a plurality of contiguous and connected lenses 400. The lenses 400 are arranged in a matrix-like formation. In one embodiment, the intermediate imaging optics 104 comprise a 6×6 array of focusing lenses 400. Notably, there is one focusing lens 400 per each pixel quadrant 300 of the FPA 200.

In such an embodiment, the dividing optics 105 comprise a plurality of contiguous and connected lens quadrants 401. Each of the lens quadrants 401 is made up of four separate and distinct, but connected lenses 403-406. Notably, there is a lens 403-406 in each of the plurality of lens quadrants 401 that focuses light onto, and therefore energizes, each light-sensing pixel 201-204 of each pixel quadrant 300 defined on the FPA 200 of the detecting device 102.

Note that in one embodiment, the intermediate imaging lenses 400 of the imaging optics 104 and the lens quadrants 401 of the dividing optics 105 are not shown with 100% fill factor. A 100% fill factor depiction would not convey, in the two-dimensional representation of the optics 104 and 105, that each of the intermediate imaging optics 104 and the dividing optics 105 comprise a plurality of lenses having a radius of curvature.

In an embodiment of the present disclosure, the intermediate imaging optics 104 and the dividing optics 105 are manufactured with a maximum transmission aperture such that the two-dimensional representation of the optics 104 and optics 105 would be a matrix of rectangular segments of a sphere, as opposed to circular segments of a sphere. Such maximization of the transmission aperture of the intermediate imaging optics 104 and dividing optics 105 serves to increase the fill factor of each of the lenses 400 and lens quadrants 401. In this regard, if the intermediate imaging optics 104 and the dividing optics 105 are manufactured as shown with reference to FIG. 4, fill factor of each of the lenses 400 and lens quadrants 401 would be restricted relative to when the fill factor of the intermediate imaging optics 104 or dividing optics 105 is maximized.

Thus, for each light-sensing pixel 201-204, there is a corresponding lens 403-406. Accordingly, for each lens 400 there is a corresponding lens quadrant 401, and for each lens quadrant 401, there is a corresponding pixel quadrant 300.

Each focusing lens 400 in intermediate imaging optics 104 focuses light on each of the corresponding lens quadrants 401. Each lens quadrant 401 divides and propagates the light received to each of the corresponding pixel quadrants 300.

Thus, each pixel 201-204 in each pixel quadrant 300 is energized by the divided light and are therefore energized substantially similar within each pixel quadrant 300.

Note that this is illustrated spatially on the FPA 200 in FIG. 4 in that a portion of the object is depicted as divided on each pixel 201 in the corresponding pixel quadrants 300. Showing the divided image on each of the pixels 201 in each pixel quadrant 300 of the FPA 200 is for illustrative purposes only. What is imaged on each of the pixels 201 in each pixel quadrant 300 of the FPA 200 is not an image but a gray scale projection of the energy per pixel 201 propagated through each corresponding lens quadrant 401, which is further depicted in FIG. 5.

FIG. 5 is an exploded view of a single optics train 500 of the system 100 depicted in FIG. 4. The optics train 500 comprises the focusing lens 400, the lens quadrant 401, and the corresponding pixel quadrant 300.

Light emitted and/or reflected from a portion of the object 107 (FIG. 4) projects an image 501 on the lens 400. The focusing lens 400 is positioned relative to the corresponding lens quadrant 401 such that light indicative of the image 501 converges as energy 502 at a central position on the lens quadrant 401.

Note that the image 501 and the energy 502 are not exact depictions of how the light is propagated through the focusing lens 400 and imaged on the lens quadrant 401 from the focusing lens 400. Rather, the image 501 and the energy 502 are shown for illustrative purposes only.

A portion of the energy 502 relative to the image 501 strikes each of the lenses 403-406 of the lens quadrant 401. Each lens 403-406 directs light to each of the corresponding pixels 201 thereby dividing energy on each of the pixels 201 relative to the quantity of light striking the lens quadrant 401. Notably, the lens quadrant 401 divides the energy among the four corresponding pixels 201.

Figure 6:
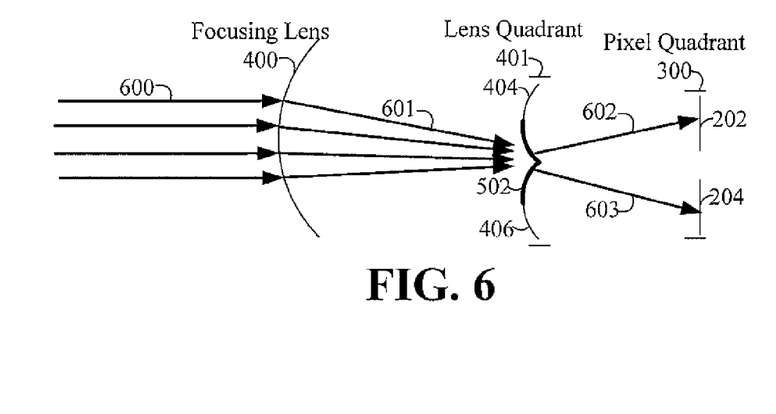
FIG. 6 is a ray tracing diagram of the optics train depicted in FIG. 5.

FIG. 6 is a side view of a ray tracing associated with the optics train 500 (FIG. 5) illustrating the focusing lens 400, the lenses 404 and 406 of the lens quadrant 401, and two adjacent pixels 201 of the pixel quadrant 300. Light, indicated by reference numeral 600, enters the focusing lens 400. As indicated by reference numeral 601, the focusing lens 401 focuses the light onto the lens quadrant 401. As shown in FIG. 6, the energy 502 is focused at the center of the lens quadrant 401. Thus, a portion of the energy strikes each of the lenses 404 and 406. The lenses 404 and 406 propagate the light, as indicated by reference numerals 602 and 603, respectively, to a corresponding pixel 202 and 204, thereby dividing the energy on each of the pixels 202 and 204 from the lens quadrant 401. Thus, the pixels 202 and 204 are co-registered with substantially the same amount of energy as the other pixels 201 and 203 in the pixel quadrant 300.

Figure 7:
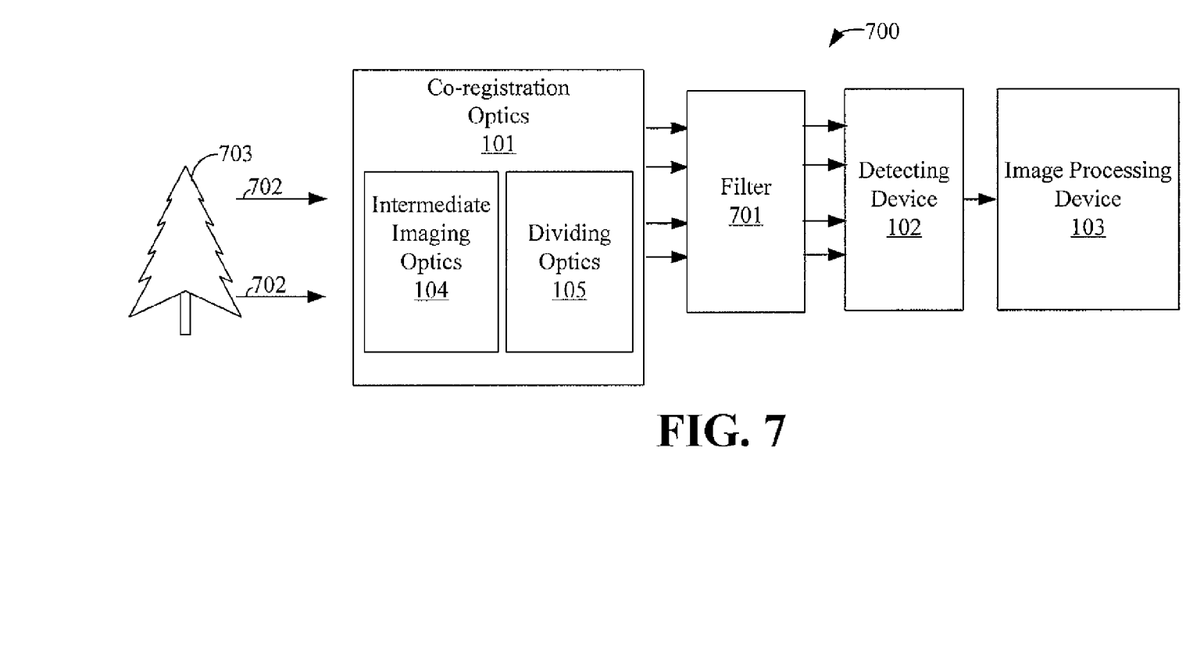
FIG. 7 is a block diagram depicting an exemplary system for optically filtering and co-registering pixels in accordance with an embodiment of the present disclosure.

FIG. 7 is a block diagram depicting another exemplary system 700 for optically co-registering pixels in accordance with an embodiment of the present disclosure. Similar to the system 100 of FIG. 1, the system 700 comprises the co-registration optics 101, the detecting device 102, and the image processing device 103. However, in addition, the system 700 comprises a filter 701 situated between the co-registration optics 101 and the detecting device 102.

The co-registration optics 101 receive light, indicated by reference arrows 702, emitted and/or reflected from an object 703, and propagate the light 702 through the filter 701 to the detecting device 102. The detecting device 102 transmits signals indicative of the light to the image processing device 101, which resolves the image 703, if possible.

The co-registration optics 101 comprise the intermediate imaging optics 104 and dividing optics 105. Similar to the system 100, the intermediate imaging optics 104 are made of a material and exhibit a shape such that the intermediate imaging optics 104 propagate and focus the light to a point at a center (not shown) of the dividing optics 105. As an example, the intermediate imaging optics 104 may comprise a lens.

The dividing optics 105 divides the light from the intermediate imaging optics 104. In this regard, energy indicative of the light 702 is divided on each of a subset of a plurality of filters of the filter device 701. The light 702 propagated through the filter 701 is imaged on the light-sensing pixels 201 (FIG. 2) of the detecting device 102. In this regard, energy is divided and propagated through the filter 701 and to the detecting device 102 on a per-pixel basis.

The filter 701 may be any type of light filter known in the art or future-developed. In one embodiment, the filter 701 comprises an array of polarization filters, and each filter in the array is designed for propagating a particular electric field component of the light. Notably, light is comprised of a plurality of electric field components that are orientated differently in the plane perpendicular to the direction of travel of the light. In another embodiment, the filter 701 is a multi-spectral filter for propagating light of differing wavebands. For purposes of illustration and discussion, the filter 701 is a polarization filter and is described in more detail with reference to FIG. 8.

As described hereinabove with reference to FIG. 1, the detecting device 102 is communicatively coupled to the image processing device 103. When the light indicative of the image 703 is imaged onto the detecting device 102, the detecting device 102 generates a plurality of electric signals (not shown) representative of the light detected. The image processing device 103 resolves the image, if possible, based upon the signals received from the detecting device 102.

Figure 8:
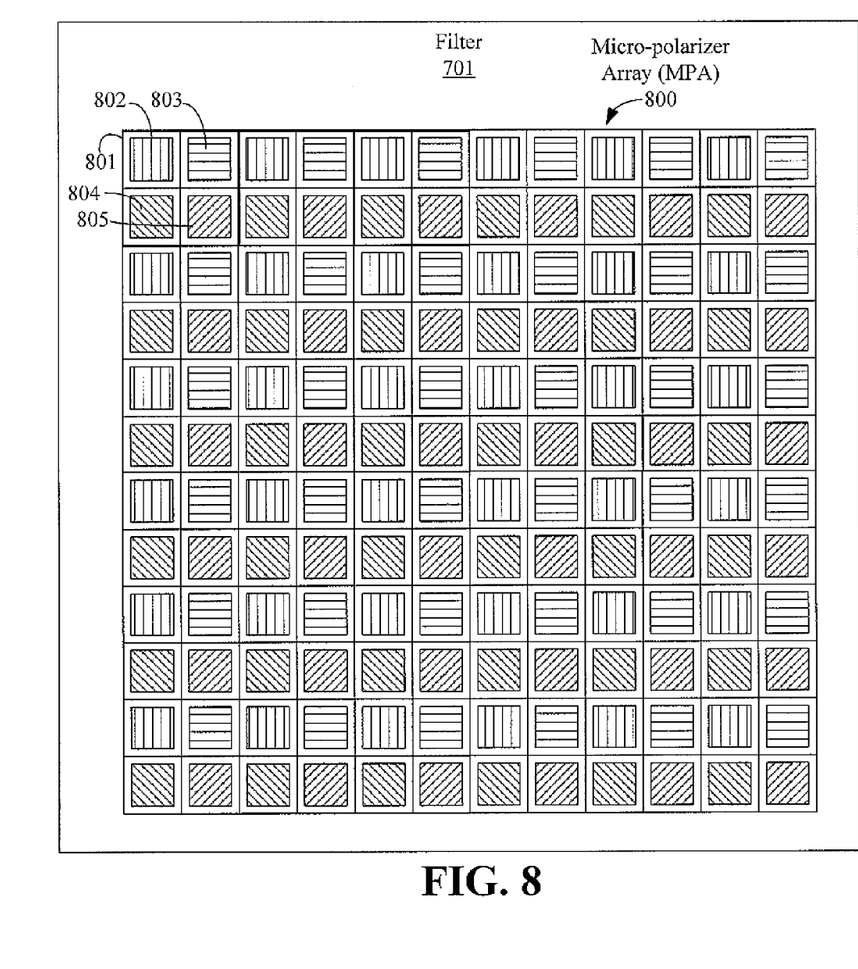
FIG. 8 is a polarization filter used in the system of FIG. 7.

FIG. 8 depicts an exemplary filter 701 comprising a micropolarizer array (MPA) 800 in accordance with an embodiment of the present disclosure. The MPA 800 comprises a plurality of filter quadrants 801. The term "filter quadrant" refers to a two-by-two array of four polarizing filters 802-805.

Each of the filters 802-805 is designed to transmit a component of light wherein each component corresponds to a different electric field component orientation of the light. As an example, filter 802 transmits electric field components of light oriented at 90°, filter 803 transmits electric field components of light oriented at 0°, filter 804 transmits electric field components of light oriented at 135°, and filter 805 transmits electric field components of light oriented at 45°.

Figure 9:
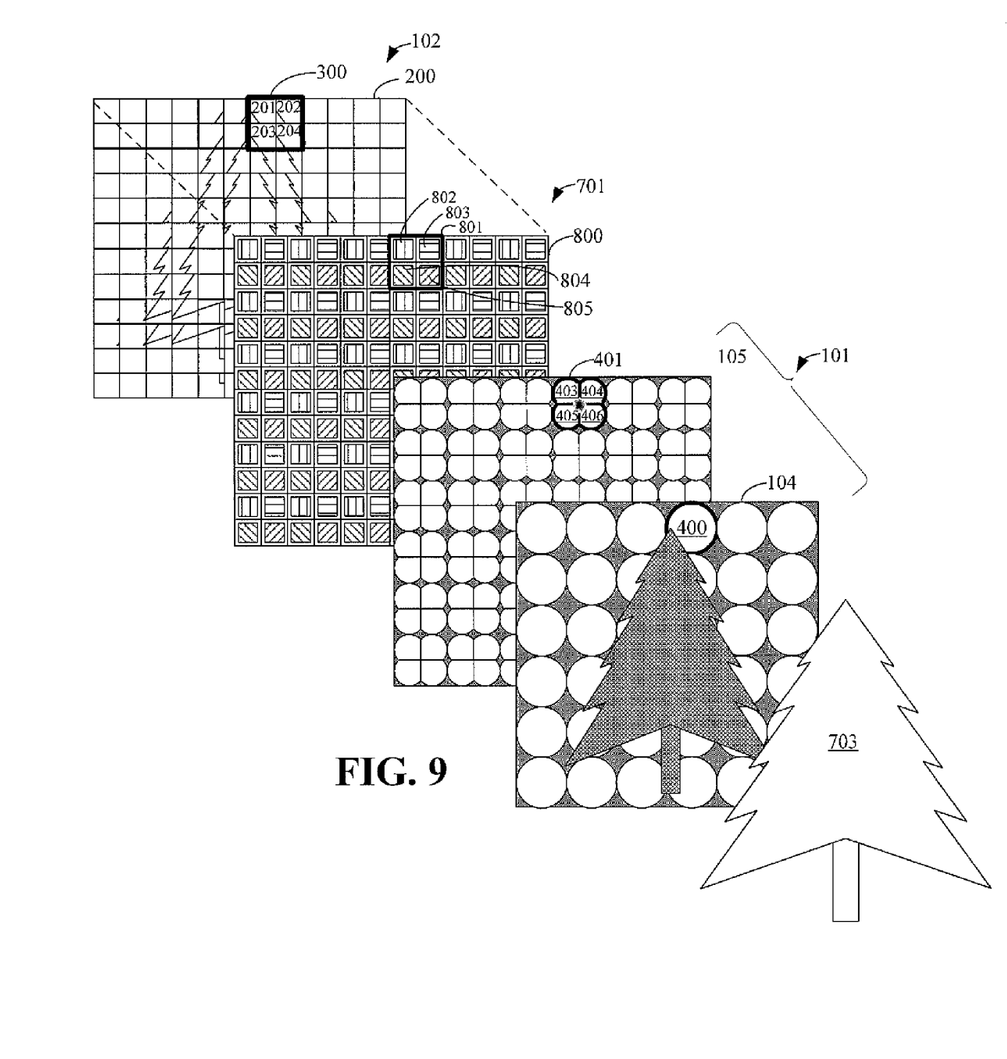
FIG. 9 is a block diagram depicting optical components of the system depicted in FIG. 7.

FIG. 9 depicts the system 700 comprising the co-registration optics 101, the filter 701, and the detecting device 102 in accordance with an embodiment of the present disclosure. The co-registration optics 101 comprise the intermediate imaging optics 104 and the dividing optics 105, which are substantially similar to and are described hereinabove with reference to FIGS. 1-6. The filter 701 comprises the MPA 800 and is situated between the co-registration optics 101 and the detecting device 102.

System 700 differs from system 100 (FIG. 1) in that there is a filter 701 prior to the detecting device 102. However, the system 700 co-registers the pixels 201 of the detecting device 102 in substantially the same manner.

In this regard, for each focusing lens 400 in the intermediate imaging optics 104, there is a corresponding lens quadrant 401. Each focusing lens 400 focuses light emitted and/or reflected from the object 703 onto each of the plurality of corresponding lens quadrants 401. Each focusing lens 400 focuses light at the center of each corresponding lens quadrant 401.

For each lens quadrant 401 there is a corresponding filter quadrant 801. Thus, for each lens 403-406 in the lens quadrant 401, there is a corresponding filter 802-805. Each lens 403-406 propagates a portion of the light to each of the filters 802-805. The portion of the light propagated by the lens quadrant 401 to each of the filters 802-805 is substantially the same in energy quantity. The lens quadrant 401 divides energy from the lens 400 and projects substantially the same energy onto each of the filters 802-805.

The detecting device 102 comprises the FPA 200 having a plurality of pixel quadrants 201-204 wherein each pixel quadrant 300 comprises four pixels 201-204. For each pixel quadrant 300 in the FPA 200 there is a corresponding filter quadrant 801. Accordingly, for each light-sensing pixel 201-204 in the pixel quadrant 300 there is a corresponding filter 802-805.

In the exemplary embodiment described with reference to FIG. 8 wherein the filter 701 is a polarization filter, light passing through each lens 401 is optically filtered by four distinct filters 802-805. In this regard, light oriented at 90° passes through filter 802 and energizes the pixel 201, light oriented at 0° passes through filter 803 and energizes the pixel 202, light oriented at 135° passes through filter 803 and energizes the pixel 203, and light oriented at 450 passes through filter 805 and energizes the pixel 204.

Therefore, the system 700 simultaneously optically co-registers a plurality of pixels 201-204. When the filter 701 is a polarization filter, the system 700 optically co-registers differing polarization information in each of the plurality of pixels 201-204 contained in the pixel quadrant 300 associated with the lens 400.

Figure 10:
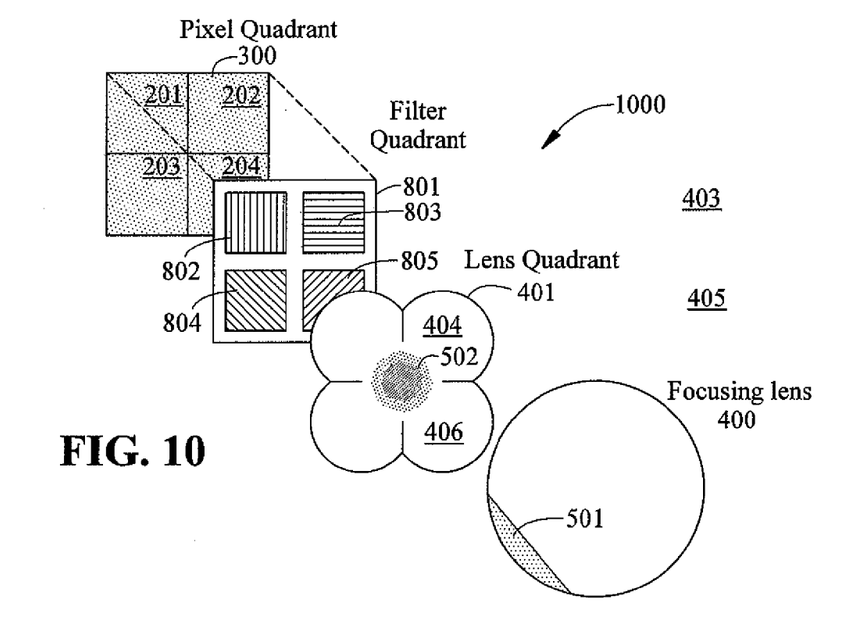
FIG. 10 is a block diagram of an optics train of the system of FIG. 7.

FIG. 10 is an exploded view of a single optics train 1000 of the system 700 depicted in FIG. 9. The optics train 1000 comprises the focusing lens 400, the lens quadrant 401, the filter quadrant 800, and the corresponding pixel quadrant 300.

Light emitted and/or reflected from a portion of the object 703 (FIG. 4) projects an image 501 on the focusing lens 400. The focusing lens 400 is positioned relative to the corresponding lens quadrant 401 such that light indicative of the image 501 converges as energy 502 at a central position on the lens quadrant 401.

Note that the image 501 and the energy 502 are not exact depictions of how the light is propagated through the focusing lens 400 and imaged on the lens quadrant 401 from the focusing lens 400. Rather, the image 501 and the energy 502 are shown for illustrative purposes only.

A portion of the energy 502 relative to the image 501 equally strikes at least a portion of each of the lenses 403-406 of the lens quadrant 401. Each lens 403-406 directs light to each of the corresponding filters 802-805 of the filter quadrant 800. As described hereinabove, in one embodiment of the present disclosure the filters 802-805 are polarization filters that transmit electric field components of light oriented at 90°, 0°, 135°, and 45°, respectively.

The light divided onto filter 802 filters all light except for that oriented at 90°. Therefore, only that portion of the light oriented at 90° energizes pixel 201. The light divided onto filter 803 filters all light except for that oriented at 0°. Therefore, only that portion of the light oriented at 0° energizes pixel 202. The light divided onto filter 804 filters all light except for that oriented at 135°. Therefore, only that portion of the light oriented at 135° energizes pixel 203. The light divided onto filter 805 filters all light except for that oriented at 45°. Therefore, only that portion of the light oriented at 45° energizes pixel 204. In such a system, the pixels 201-204 are simultaneously co-registered with polarization information obtained from the image 703.

Figure 11:
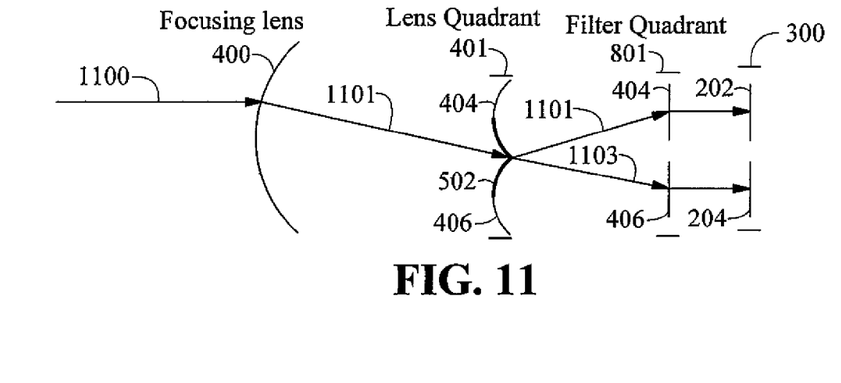
FIG. 11 is a ray tracing diagram of the optics train depicted in FIG. 10.

FIG. 11 is a side view of a ray tracing associated with the optics train 1000 (FIG. 10) illustrating the focusing lens 400, the lenses 404 and 406 of the lens quadrant 401, two filters 803 and 805 of the filter quadrant 801, and two adjacent pixels 202 and 204 of the pixel quadrant 300. Light, indicated by reference numeral 1100, enters the focusing lens 400.

As indicated by reference numeral 1101, the focusing lens 400 focuses the light onto lenses 404 and 406 of the lens quadrant 401. As shown in FIG. 11, the energy 502 is focused at the center of the lenses 404 and 406. Each of the lenses 404 and 406 reflects the light, as indicated by reference numerals 1102 and 1103, respectively, to the corresponding filters 803 and 805 of the filter quadrant 801, respectively.

Through the filter quadrant 801, the light strikes pixels 202 and 204. The optics train 1000 divides the energy on each of the pixels 202 and 204 from the lens quadrant 401 through the filter quadrant 801. Thus, the pixels 202 and 204 are co-registered with the polarized electric field components of the light oriented at the direction of each corresponding filter 802-805.

In one embodiment of the system 100 (FIG. 1), the lenses 400 (FIG. 4) are offset with respect to their corresponding lens quadrants 401 (FIG. 4) in order to ensure that energy is evenly distributed onto their corresponding pixel quadrants 300 (FIG. 4). This concept is further illustrated with respect to FIGS. 12-15.

Figure 12:
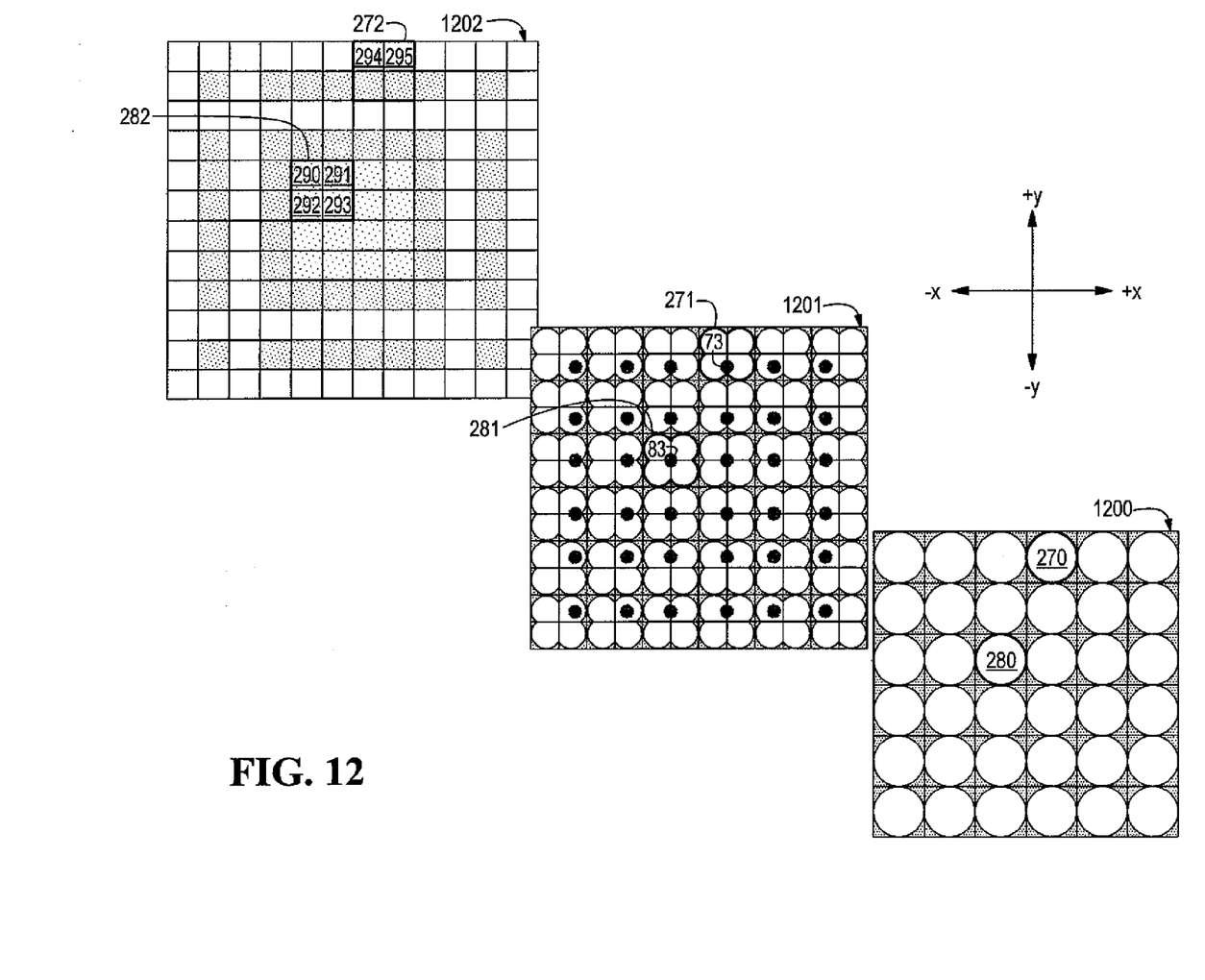
FIG. 12 is a block diagram illustrating intermediate imaging optics, dividing optics, and a corresponding FPA.

FIG. 12 depicts intermediate imaging optics 1200 comprised of a plurality of lenses, including lens 270 and lens 280. FIG. 12 further illustrates dividing optics 1201 comprised of a plurality of lens quadrants, including lens quadrant 271 and lens quadrant 281 corresponding to lenses 270 and 280, respectively. In addition, FIG. 12 depicts a corresponding FPA 1202 comprised of a plurality of pixel quadrants, including pixel quadrant 272 corresponding to lens 270 and lens quadrant 271 and pixel quadrant 282 corresponding to lens 280 and lens quadrant 281.

Note that FIG. 12 is an exploded view of the intermediate imaging optics 1200, dividing optics 1201, and FPA 1202. As described hereinabove, in one embodiment, each of these components 1200-1202 is microfabricated on a semiconductor. They are illustrated in an exploded view in order to fully illustrate concepts in accordance with an embodiment of the present disclosure.

Further note that as used herein, lens 270 corresponding to lens quadrant 271 and pixel quadrant 272 means that light entering lens 270 is focused onto lens quadrant 271. Further, light focused onto lens quadrant 271 is divided and energizes a plurality of pixels 294-297 of the pixel quadrant 272. Also, as used herein, lens 280 corresponding to lens quadrant 281 and pixel quadrant 282 means that light entering lens 280 is focused onto lens quadrant 281. Further, light focused onto lens quadrant 281 is divided and energizes a plurality of pixels 294-297.

In FIG. 12, each lens in the intermediate imaging optics 1200 is illustrated as evenly distributed in a matrix-like fashion. In such an example, light focused onto the plurality of lens quadrants in the dividing optics 1201 may not be appropriately centered onto their corresponding lens quadrants. In this regard, for each pixel quadrant, e.g., 272 and 282, the corresponding lens quadrants, e.g., 271 and 281, is to evenly energize each of the corresponding pixels 294-297 and 290-293, respectively.

To further illustrate, light propagating through lens 280 may generate energy 83 centered on the lens quadrant 281. Because it is centered on the lens quadrant 281, each of the corresponding pixels 290-293 are evenly energized by the light passing through the lens quadrant 281.

However, light propagating through lens 270 may generate energy 73 on the lens quadrant 271 that is not centered on the lens quadrant 271. Notably, energy 73 may be off-centered in the −y direction, as shown, due to the location of the lens 270 in the intermediate imaging optics 1200.

Because the energy 73 is not centered on the lens quadrant 271, each of the corresponding pixels 294-297 are not evenly energized by the light passing through the lens quadrant 281. In particular, the energy 73 is off-centered in the −y direction such that all the energy 73 energizes pixels 296 and 297 without energizing pixels 294 and 295.

Note that for brevity, only one lens quadrant 271 and pixel quadrant 272 is described having off-centered energy 73. Further note that only one dimension is described as being offset, i.e., in the −y direction. However, based upon location of the lens quadrants in the dividing optics 1201, the energy focused onto the corresponding lens quadrants may be offset from center in the +/−y or +/−x direction.

Figure 13:
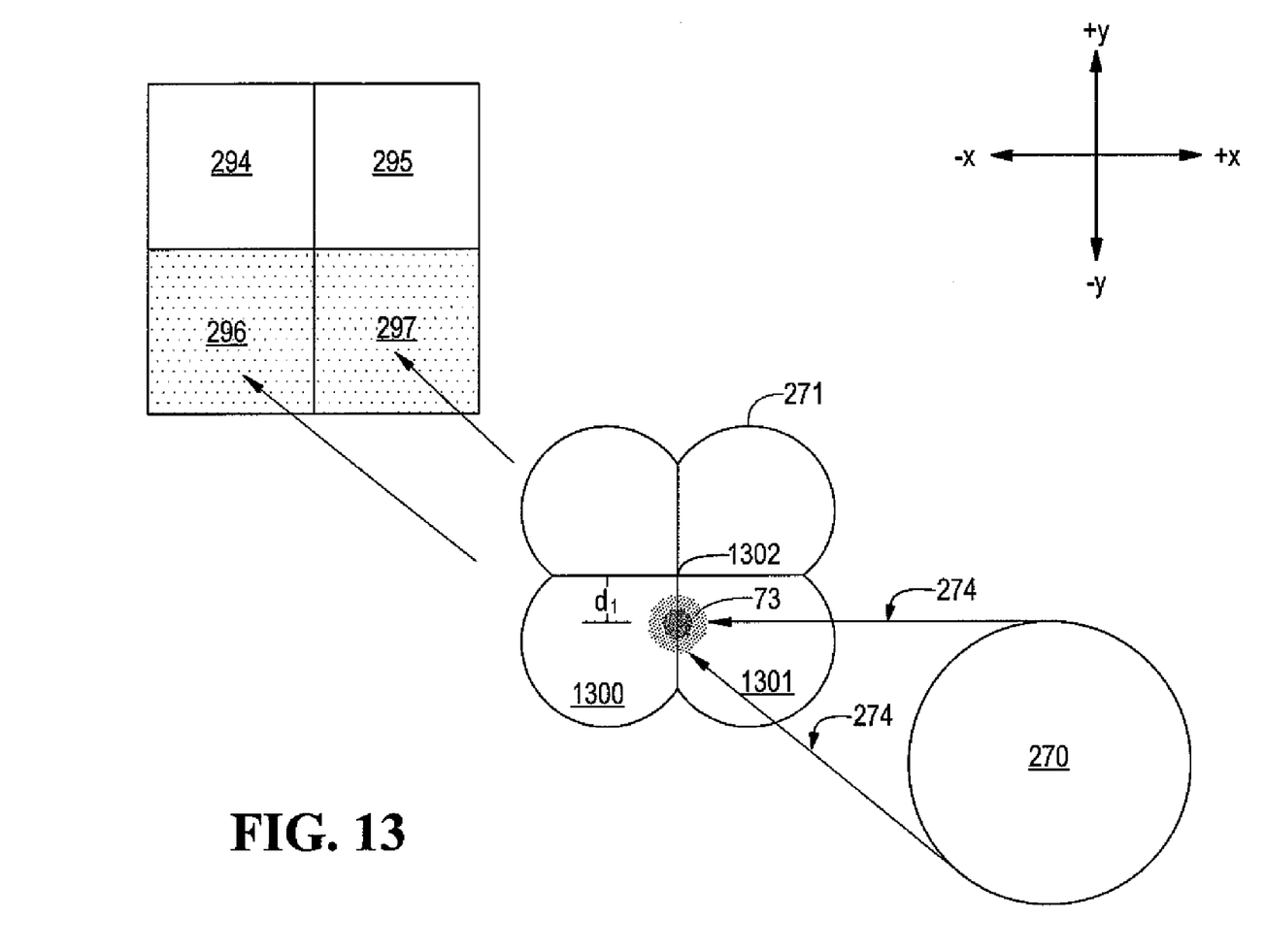
FIG. 13 is a block diagram depicting a lens, a lens quadrant and a pixel quadrant as shown in FIG. 12.

FIG. 13 depicts the lens 270 directing light 274 onto the lens quadrant 271. The lens 270 projects light 274 such that the energy 73 is displaced by $d_1$ in the −y direction from a center 1302 of the lens quadrant 271. The energy 73 is divided only between a lens 1300 and a lens 1301 of the lens quadrant 271. Therefore, the energy is not evenly distributed onto the pixel quadrant 272 and only pixels 296 and 297 of the pixel quadrant 272 are energized.

Figure 14:
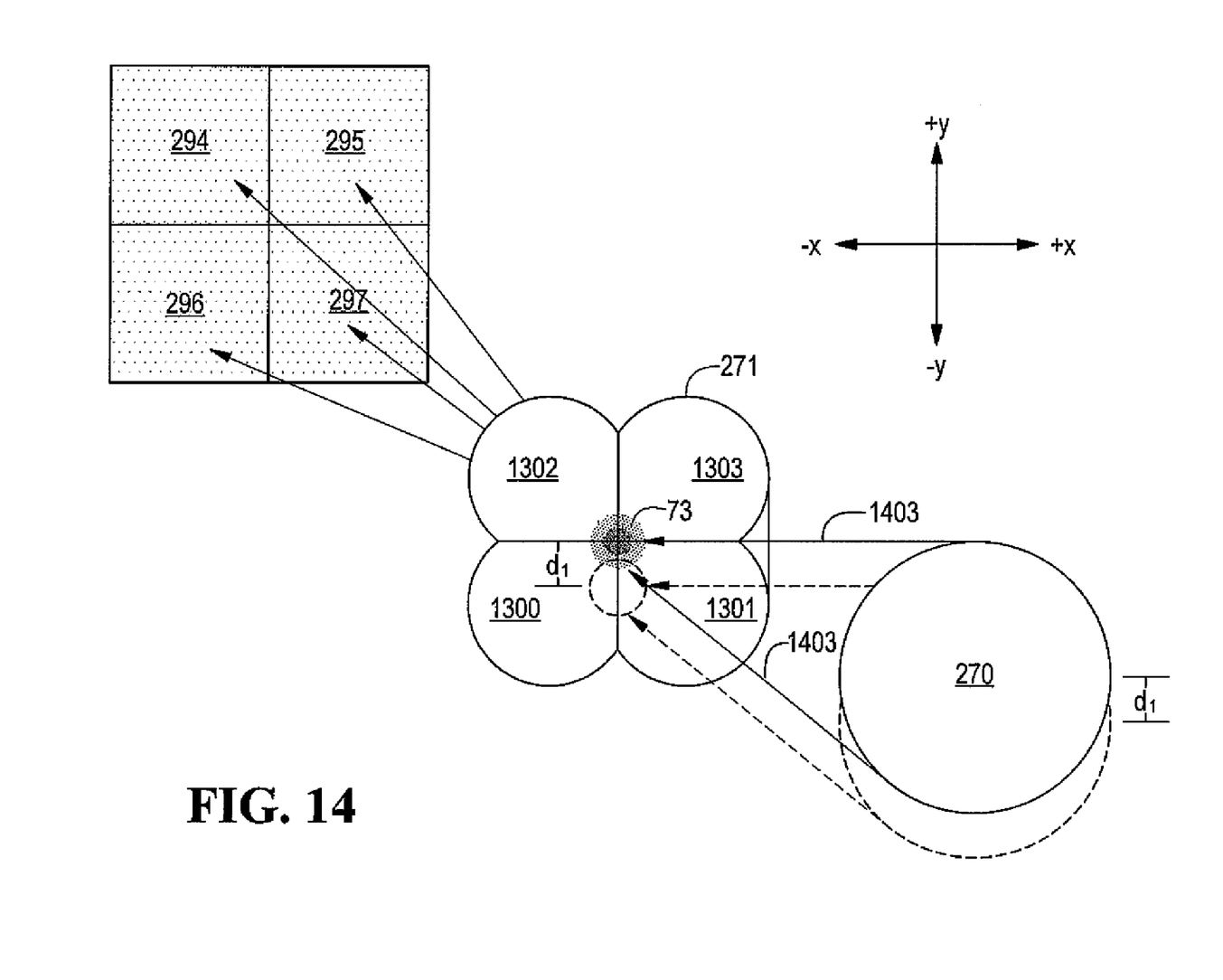
FIG. 14 is a block diagram depicting an offset of the lens of FIG. 13 so that the pixels are evenly energized through the lens quadrant.

In order to ensure that each lens quadrant in the dividing optics 1201 evenly divides and distributes energy onto the pixels in their corresponding pixels quadrants in the FPA 1202, each lens in the intermediate imaging optics 1200 can be designed with offset, if needed, in the matrix-like formation. To further illustrate, FIG. 14 depicts the lens 270 directing light 1403 onto the lens quadrant 271. However, in contrast to FIG. 13, the lens 270 is moved $d_2$ in the +y direction.

Because the lens 270 is now moved, the lens 270 projects light 1403 such that the energy 73 is centered on the lens quadrant 271 and is no longer offset. The energy 73 is now divided between all four lenses 1300-1304 of the lens quadrant 271. Therefore, the energy is now evenly distributed onto the pixel quadrant 272 and each pixels 294-297 of the pixel quadrant 272 is equally energized.

Figure 15:
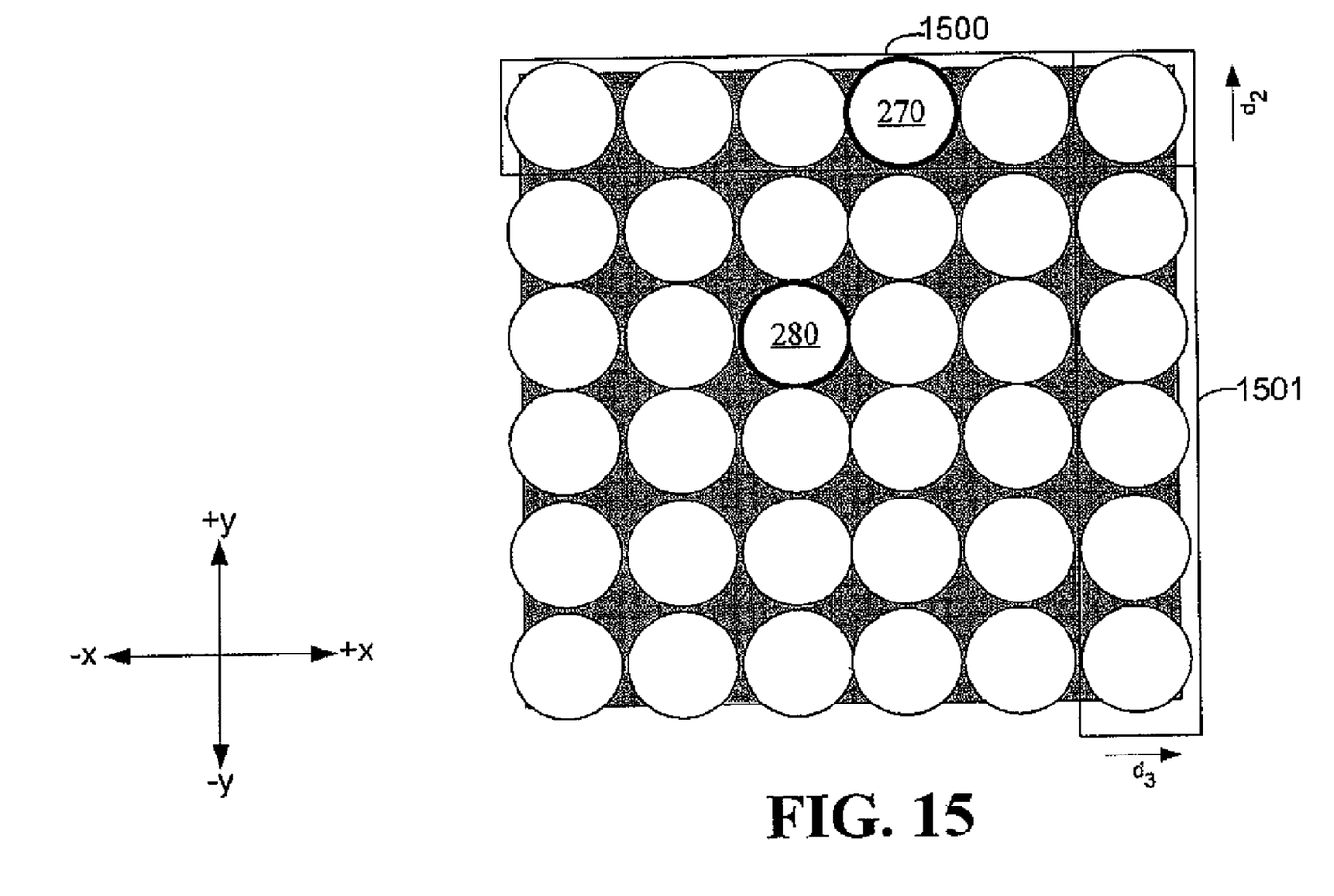
FIG. 15 depicts a plurality of offset lenses of the intermediate imaging optics depicted in FIG. 12.

In design of the intermediate imaging optics 1200, such analysis can be performed for each lens, e.g., 270 and 280, and corresponding lens quadrant, e.g., 271 and 281, respectively. FIG. 15 depicts exemplary positioning of each lens in the intermediate imaging optics 1200 after such an analysis has been performed for each lens. Thus, as an example, each of the lenses in the row 1500 may be offset by $d_2$ in the +y direction to account for the position of the lenses in row 1500. Whereas, those lenses in row 1501 may be offset by $d_3$ in the +x direction to account for the position of the lenses in row 1501.

Figure 16:
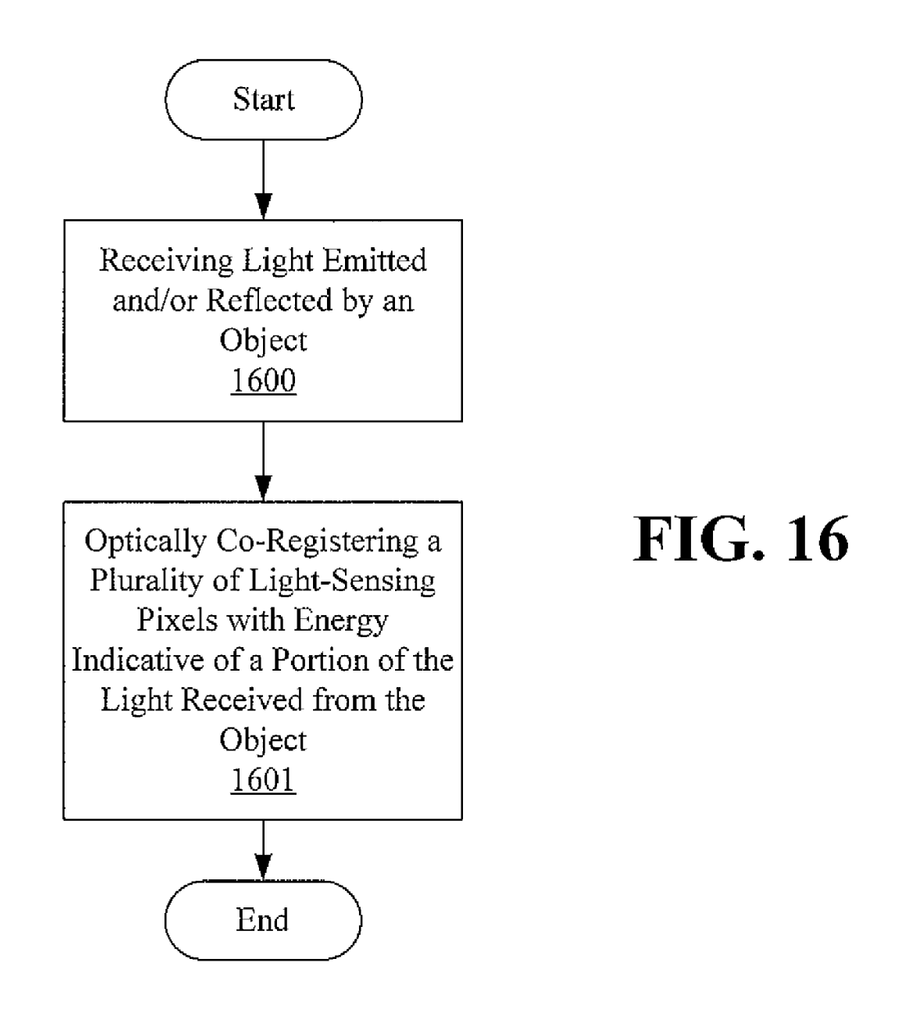
FIG. 16 is a flowchart depicting exemplary architecture and functionality of the system of FIG. 1.

FIG. 16 is a flowchart depicting an exemplary method in accordance with an embodiment of the present disclosure. In such a method, the system 100 (FIG. 1) receives light 106 (FIG. 1) emitted and/or reflected from an object 107 (FIG. 1), as indicated in step 1600. In one embodiment, the light 106 is received by co-registration optics 101 (FIG. 1) comprised of intermediate imaging optics 104 (FIG. 1) and dividing optics 105 (FIG. 1).

The co-registration optics 101, upon receipt, optically co-registers a plurality of light-sensing pixels with energy indicative of a portion of the light received, as indicated in step 1601. The co-registration optics 101 accomplishes co-registration by focusing the light 106 at a center of a lens quadrant 401 (FIG. 4). In one embodiment, the lens quadrant 401 divides energy indicative of the light on each pixel in a set of pixels thereby co-registering the pixels with the energy.

Now, therefore, the following is claimed:

1. A system, comprising:
   an optical element having a plurality of contiguous lenses;
   a detecting device having a plurality of light-sensing pixels, the optical element having a lens in the plurality of lenses associated with each of the plurality of light-sensing pixels; and
   intermediate imaging optics for receiving light emitted and/or reflected from an object and focusing the light onto the plurality of contiguous lenses such that energy indicative of the image is divided on each of the associated light-sensing pixels
   wherein the optical element comprises a plurality of lens quadrants, the intermediate imaging optics comprises a plurality of focusing lenses organized in a matrix-like formation, the intermediate imaging optics having a focusing lens corresponding to each of the plurality of lens quadrants, and at least one of the lenses is offset with respect to a center of the corresponding lens quadrant so that the light focuses on the center of the lens quadrant.

2. The system of claim 1, wherein each lens in at least one of the lens quadrants focuses a portion of the light onto a corresponding one of the plurality of light-sensing pixels thereby equally dividing energy on each of the plurality of light-sensing pixels.

3. The system of claim 1, further comprising a filter associated with each contiguous lens or subset thereof.

4. The system of claim 3, wherein each filter is positioned between one of the contiguous lenses and corresponding light-sensing pixel.

5. The system of claim 4, wherein each filter is a polarization filter for filtering differing light electric field component orientations.

6. The system of claim 5, wherein the optical element transmits a portion of the light through each filter such that each light-sensing pixel is energized by light associated with a differing electric field component orientation based upon the corresponding filter.

* * * * *